May 9, 1967
TJERK REYENGA
3,319,209
TORQUE ADJUSTING DEVICE
Filed Jan. 9, 1964
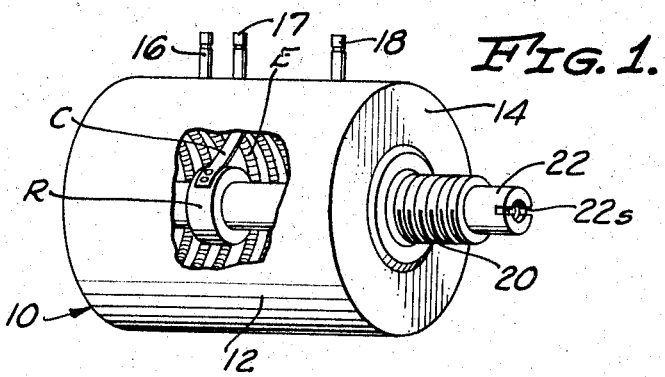
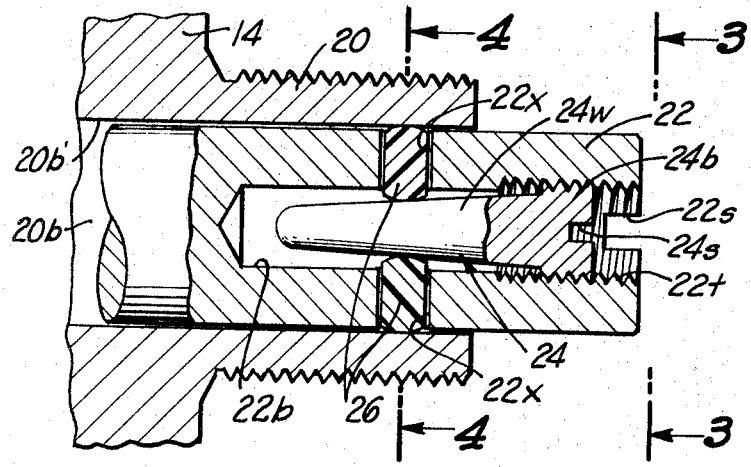
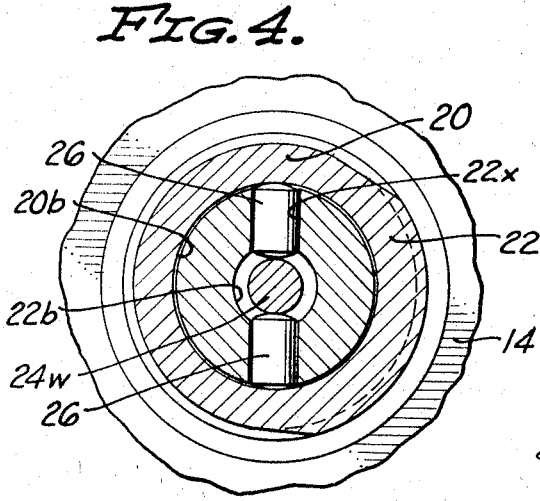
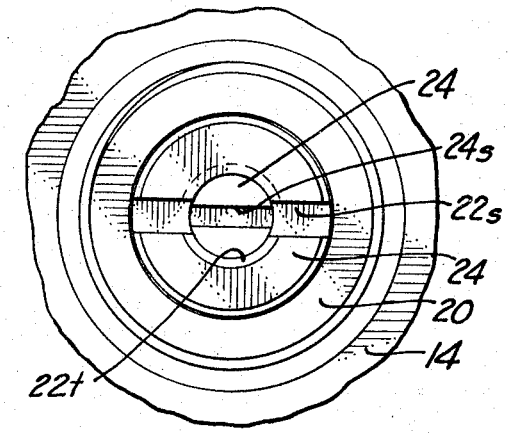
INVENTOR.
TJERK REYENGA
BY

United States Patent Office 3,319,209
Patented May 9, 1967

3,319,209
TORQUE ADJUSTING DEVICE
Tjerk Reyenga, Westminster, Calif., assignor to Bourns, Inc., a corporation of California
Filed Jan. 9, 1964, Ser. No. 336,655
10 Claims. (Cl. 338—162)

The invention hereinafter described and illustrated pertains to rotary instruments such as multi-turn potentiometers, in which adjustment of the instrument is effected by rotation of a shaft. More particularly, the invention pertains to rotary instruments such as multi-turn potentiometers, in which adjustment is effected by rotation of a shaft and in which it is desirable to adjustably fix the torque required for rotation of the shaft to any selected value within a wide range of torque values. The invention has application in all instances wherein it is desirable to have equal counter-torque or resistance to rotation exhibited by all of a series of like instruments, such as all of a plurality of multi-turn potentiometers mounted on a particular panel; and the invention also has meritorious application in the provision of means for adjustably locking the shaft of an instrument of the class noted in a desired position.

In the prior art it is known to mount a wedge-collet device on the shaft of a rotary instrument and utilize a complementary draw-nut on the bushing of the instrument to compress the wedges into locking engagement with the instrument shaft, whereby the shaft is locked against rotation. Such prior art devices are undesirable in several respects; for example, (1) they occupy space that is desired for knob means, dial indicator means, connector means or the like; (2) they are bulky and unsightly; (3) they are difficult to tighten or release without disturbing the instrument shaft; and (4) the parts are at least partly exposed and so are subject to being damaged or becoming stuck by dust, dirt, or other objects.

The presently disclosed invention overcomes the noted disadvantages of the prior art devices by utilizing space inside the instrument shaft to contain means which by simple adjustment will provide, in conjunction with a stationary part of the instrument, counter-torque or resistance to rotation of the desired value. By housing or locating the adjustable means largely or entirely within the confines of the adjustment shaft of the instrument, the means are protected against the ambient environment, they occupy only otherwise wasted space, and they are not visible to the casual observer of the instrument. Further, by virtue of details and features of construction presently to be disclosed or described, locking and release may be easily effected without disturbing the setting of the instrument.

Briefly, the invention comprehends providing an internal preferably axial bore in the accessible end of the adjustment shaft of the instrument, with a set of one or more transverse openings or passages leading outwardly from the bore to the exterior of the shaft, a complementary set of movable components each disposed at least in part in a respective one of the openings or passages and each having an outer frictional surface arranged to frictionally engage an encircling wall provided by the shaft bushing or other fixed structure of the instrument and each of the components having an inner end or portion arranged to be operated by actuating means so as to increase or decrease the intensity of the frictional engagement to thereby adjust or vary the amount of torque required to rotate the shaft relative to the fixed structure, and the provision of actuating an appurtenant means largely disposed in the bore in the shaft for operating the named components. Conveniently the set of transverse openings or passages (only one of which is necessary but of which two are preferably provided) may be aligned holes drilled through the shaft into the bore, and the movable components or elements are simple cylinders or plugs of nylon with suitably rounded ends which provide outer frictional surfaces. Also, conveniently, the actuating means for operating the friction members may conveniently be cam means that preferably is in the form of a generally conically tapered wedge disposed in the bore of the shaft with an intermediate portion of the tapered surface in driving contact with the inner ends of the plugs. The actuating means is conveniently given operative movement by being connected, preferably integrally, to an externally screw-threaded member or portion the thread of which is complementary to and in engagement with a screw thread provided in the wall of the bore of the shaft. Thus rotation of the screw-threaded member relative to the shaft in one direction causes translation of the cam or wedge along the bore in a first direction whereby the plugs are pressed outwardly into more intense or firm frictional engagement with the cylindrical wall or surface of the bushing or like cylindrical opening of the instrument. Reverse rotation of the screw-threaded member in the shaft accordingly permits inward movement of the plugs (or permits reduction in the force applied to them) to relieve the frictional engagement of the plugs with the stationary cylindrical surface. By virtue of the cam means, and especially by virtue of the particular cam means used, the magnitude or extent of the outward force applied may be very closely adjusted to any desired degree and thus the frictional drag applied by and through the plugs, and the resistance to rotation of the shaft, may be adjusted to a desired value of torque. As will be evident, the frictional drag of the plugs on the cylindrical wall can be increased to the extent that the effect is that of a lock, for all practical purposes. However, since the primary purpose is to permit very close adjustment or regulation of the torque required to rotate the shaft whereby differences in other frictional effects (wiper or contact drag, bearing drag, etc.) in the instruments of a group may be compensated, the plugs are preferably made of a slightly resilient self-lubricating material such as nylon, and the inner cylindrical wall of the bushing or other opening encircling the adjusting shaft is preferably polished. As will be evident to those skilled in the art, adjustment of the device or means of the invention is not hampered by, but is in fact aided by, presence of a knob or other like shaft-rotating instrumentality on the shaft.

The preceding general description of the invention makes it evident that it is a principal object of the invention to provide improvements in means for effecting adjustments of resistance of an instrument shaft to turning torque applied to the shaft.

Another object of the invention is to provide means substantially entirely within a journaled shaft for adjusting the resistance of the journal to rotation of the shaft therein.

An additional object of the invention is to provide means operable in a shaft and a journal rotatably receiving the shaft, for adjusting the resistance to rotation of the shaft.

Other objects and advantages of the invention will hereinafter be set forth in the appended claims or made evident in the following description of a preferred exemplary embodiment of the invention in a precision multi-turn rotary potentiometer as illustrated in the accompanying drawings.

In the drawings:

FIGURE 1 is a pictorial view of an instrument in the form of a precision multi-turn rotary potentiometer in which the invention has been incorporated, the instrument comprising a bushing and an adjusting shaft journaled in the bushing;

FIGURE 2 is a fragmentary partial sectional view along a plane containing the axis of the shaft of the instrument depicted in FIGURE 1, the view depicting the relationship of essential elements of the invention, the drawing being on grossly enlarged scale;

FIGURE 3 is an end view of part of the structure shown in FIGURE 1, viewed as indicated by line 3—3 of FIGURE 2;

FIGURE 4 is a fragmentary transverse sectional view of structure shown in section in FIGURE 2, the view being taken at a transverse plane and in the direction indicated by line 4—4 of FIGURE 2.

Referring first to FIGURE 1, there is indicated by ordinal 10 a typical exemplary instrument 10 of the type to which the present invention is applicable, with the invention applied. As illustrated, instrument 10 is a multi-turn rotary potentiometer having a generally cylindrical body or housing 12 that comprises an end 14 and has protruding from the body thereof a plurality of electrical terminals 16, 17 and 18. End 14 comprises an axially-extending externally-threaded bushing 20 that is fixed to or formed integral with the remainder of the end of the housing, as indicated, and which bushing provides a cylindrical opening into the housing. Bushing 20 is, or may be, of conventional or well known construction and may thus be adapted for extending through an aperture formed in a panel and threaded to receive means such as a nut and washer whereby the instrument may be mounted on the panel in a manner universally understood in the electrical instruments arts. As is well known, the bushing, or other like tubular mounting member of the instrument, may be of any desired length. The instrument also comprises an adjusting shaft 22 that is rotatable in bushing 20. Shaft 22 may be rotated by a knob device (not shown) which may be attached to the shaft by suitable means such as a set screw, or the shaft may be rotated by a tool such as a screwdriver whose bit may be engaged in a slot 22s provided in the end of the shaft. The structure thus far enumerated and specifically described may be conventional and of various sizes and relative dimensions. Shaft 22 may alternatively be operated by a servo-motor or the like, as is customary in servo-mechanisms employing multi-turn rotary potentiometers. In many such instances it is desirable to have provisions for adjusting the torque or turning effort necessary to cause rotation of the shaft. Since generally the bushing 20 is of brass or like material, and since the shaft may have a load may vary from instrument to instrument and may or may not be supported on anti-friction bearings, the required torque may vary considerably from instrument to instrument.

The adjusting shaft 22 of the instrument is used to rotate instrumentalities in the instrument housing, and in the illustrated exemplary embodiment the inner end portion of the shaft rotatably supports a wiper rotor R which has secured thereto a wiper or contact C the outer end of which brushes on and is guided by a helical means comprising a resistance element E. The inner end of the shaft may be journaled in bearing means (not shown) in the end of the housing 14. The adjustable rotary means comprising instrumentalities R and C may, in different instruments, offer different counter-torques or resistances to rotation of the respective adjusting shafts. As is evident, an intermediate portion of shaft 22 is disposed in the opening or bore 20b provided by housing 14 and specifically by bushing 20; and the outer, or accessible end of the shaft is utilized for attachment of a knob, coupling, or other torque-applying means.

In accord with the invention, shaft 22 is provided with an axial bore 22b (FIGURE 2) which at its outer end is tapped as indicated at 22t. Disposed in bore 22b is an actuating means comprising a cam means in the form of a preferably integral means 24 which comprises a generally conical wedge or cam portion 24w and a base portion 24b that is externally threaded to be complementary to and engage the tapped portion 22t of bore 22b, the relative dimensions and arrangement preferably being such that the wedge means is substantially coaxial with the shaft 22 and the bore of bushing 20 and such that rotation of the actuating means 24 relative to shaft 22 causes translation of wedge portion 24w in bore 22b, the direction of the translation being dependent upon the direction of the relative rotation as is evident. Rotation of the base portion 24b of the wedge means may be effected by rotation of a tool, such as a screwdriver, engaged in or with a complementary formation, such as a slot 24s, provided in or on base portion 24b. As shown, and as preferred, the wedge portion 24w and the base portion 24b are integral of the actuating means 24, although that need not necessarily be true in the practice of the invention.

Shaft 22 is further provided with a set of preferably radial openings or bores 22x which set preferably but not necessarily comprises two such openings and which openings preferably but not necessarily, are simple drilled holes disposed with their axes intersecting the axis of bore 22b and disposed at 90° to the latter axis, all as shown in the drawings.

Disposed in respective ones of the transverse bores 22x of the shaft are individual elements or members of a set thereof equal in number to the bores 22x. The elements have outer frictional surfaces and are in the form of generally cylindrical plugs 26. The plugs 26 are preferably slightly rounded at their outer ends, and may be, as shown, rounded at their inner ends as well, whereby they may be symmetrical and whereby the curvature of the outer ends may be complementary to that of the bore or encircling cylindrical inner wall of the bushing 20. The plugs 26 are of sectional configuration such as to be complementary to that of bores 22x, which configuration preferably and as shown is circular; and the plugs are dimensioned for a free-sliding fit in the respective bores or openings. The bores 22x may be of square or other geometrical cross-section within the concept of the invention, but preferably are of round cross-section for obvious reasons. The plugs 26 may be of any suitable material, and in an exemplary and successful construction in which shaft 22 is of stainless steel and bushing 20 is of brass, plugs of "nylon" are used. The plugs are of length such that with their inner ends in contact with wedge portion 24w at approximately the longitudinal center of the tapered or conical cam surface of the actuating means, their outer ends are in light contact with the wall of the bore 20b of bushing 20; and the wedge means is so dimensioned that with the plugs in that attitude the threaded base portion 24b of the actuating means is approximately midway along the tapped portion 22t of bore 22b.

From the preceding description it becomes evident that with the several described components in the relative positions indicated in FIGURE 2, with shaft 22 substantially fully occupying the interior space provided by bore 20b, rotation of the actuating means 24 to produce inward translation thereof applies compressive forces to the plugs whereby they are pressed into firmer frictional engagement with encircling wall 20b' and provide increased resistance to rotation of shaft 22. Similarly, opposite rotation and translation of the actuating means permits the plugs to move inwardly in their respective bores and to slide freely in incidental contact with the wall of bore 20b. Since the wedge portion 24w of the actuating or wedge means is of low taper, the actuating means maintains itself in position in bore 22b irrespective of whether the plugs are in tight engagement with the wall of bore 20b, or are loose in their bores or are in an intermediate state of stress. Thus, by adjusting the position of wedge means 24 in bore 22b, the "counter-torque" or resistance to rotation of shaft 22 relative to bushing 20 may be adjusted to any desired value.

As is also evident, the device comprising the board shaft 22, actuating means 24, plugs 26 and the encircling wall of bore 20b may be utilized as a brake or lock by suitably adjusting the position of means 24 in bore 22b.

While a set of plugs 26 and bores 22x two in number has been used in the illustrated embodiment of the invention, the set of plugs and of bores may be restricted to one or may be increased to three or more according to the dictates of the instrument designer. Preferably, and for obvious reasons, a symmetrical disposition of plugs 26 about shaft 22 is made.

The preceding description of a preferred exemplary physical embodiment of the invention makes it evident that the stated objects of the invention have been attained. It also is evident that in the light of the foregoing disclosure of an exemplary embodiment of the invention, modifications or changes of the disclosed structure will occur to those skilled in the art and it is therefore not desired to limit the invention to specific details of the illustrated form, other than as it is restricted by the appended claims.

I claim:

1. A rotary variable resistor comprising:
   first means, including means providing a housing with means for rotatively supporting an adjusting shaft and said first means including a member having an opening thereinto having a cylindrical inner wall and adapted to receive an adjusting shaft therethrough;
   second means, including an adjusting shaft having an inner end portion, an intermediate portion disposed in said opening and an accessible outer end portion having a bore therein and a screw thread on the wall of the bore and said bore extending into said intermediate portion, said shaft having in said intermediate portion a transverse opening extending through from said bore to the exterior of said shaft;
   third means, including screw-threaded means and cam means connected thereto and disposed at least principally in said bore and the thread of which is complementary to and engaged with the internal thread of said shaft, said cam means being movable in said bore incident to rotation of said screw-threaded means relative to said shaft;
   fourth means, including means disposed at least in part in said transverse opening of said shaft and having an outer frictional surface arranged to frictionally engage said inner wall of said first means and having an inner portion engaged by said cam means for operation thereby incident to movement of said cam means in said bore by rotation of said screw-threaded means;
   and fifth means, including resistance element means and wiper means supported in part by said first means and in part by said shaft and adjusted by rotation of said shaft relative to said housing;
   whereby adjustment of said cam means effects adjustment of the frictional engagement of said fourth means with said wall to adjust the resistance to rotation of said shaft relative to said housing.

2. A rotary variable resistor according to claim 1, in which said cam means comprises a generally conically tapered wedge device.

3. A rotary variable resistor according to claim 2, in which said screw-threaded means and said cam means are comprised in an integral device.

4. A rotary variable resistor according to claim 2, in which said means having an outer frictional surface comprises a plug-like member having characteristics at least similar to those of nylon.

5. A rotary variable resistor according to claim 1, in which said member having a cylindrical inner wall is an externally-threaded bushing providing a means adapted for mounting the variable resistor on a panel or like supporting structure.

6. For a rotary variable resistor having a housing and a tubular member providing a cylindrical inner wall and adapted to receive a rotary adjusting shaft, the combination comprising:
   first means, including an adjusting shaft comprising an inner end portion adapted to be disposed in the resistor housing and said shaft comprising a portion adapted to be disposed in said tubular member for rotation therein, said shaft having a bore therein and said shaft having a threaded portion along a wall of said bore and said shaft having a transverse opening from said bore to the exterior of the shaft adjacent said inner cylindrical wall;
   second means, including cam means disposed at least principally in said bore in said shaft, said cam means providing a cam surface in said bore adjacent to said transverse opening, and said second means including threaded means engaged with said threaded portion of said shaft and said threaded means being connected to said cam means to operate the latter incident to movement of said threaded means relative to said threaded portion; and
   third means, comprising movable means disposed at least in part in said transverse opening and having a frictional surface disposed to be forced into frictional engagement with said cylindrical inner wall and having a portion arranged for coaction with said cam means for operation of said movable means by said cam means incident to operation of the latter;
   whereby by movement of said threaded means relative to said threaded portion the frictional engagement of said frictional surface with said cylindrical inner wall the resistance to rotation of said shaft in said tubular member may be adjusted.

7. An instrument comprising:
   first means, including a structure having a cylindrical opening providing an interior space with an encircling wall, and adjustable rotary means;
   second means, comprising a rotatable shaft supporting said adjustable rotary means and having a portion rotatable in said space and having an accessible end having an axial bore therein having an internally threaded portion and having a transverse opening therein interconnecting the axial bore and the outside of the shaft;
   third means, comprising a device axially translatable in said bore said device including an externally threaded portion in engagement with the internally threaded portion of said shaft, and said device including an axially-extending tapered wedge portion having a cam surface in said axial bore arranged for translation in either of opposite axial directions therein incident to rotation of said externally threaded portion relative to said shaft;
   and fourth means, including at least one component disposed at least in part in said transverse opening and having an outer frictional surface adapted to frictionally engage said encircling wall and having an inner surface arranged and disposed for movement by said wedge portion in response to translation of said device in at least one of said opposite directions, whereby incident to such translation of said device incident to rotation of said externally threaded portion relative to said shaft the friction surface of said component is forced into compressive frictional engagement with said encircling wall to increase resistance to rotation of said shaft in said cylindrical opening.

8. An instrument comprising:
   first means, comprising a rotatable shaft, said shaft having an accessible and internally-bored end formed with an internally threaded portion and at least one transverse opening interconnecting the exterior of the shaft with the bore therein, and means operable by said shaft;
   second means, comprising a member having an axially tapered wedge portion translatable in the bore in said shaft, said second means including externally threaded means complementary to and engaged with said threaded portion and connected to said wedge portion to translate the said wedge portion axially in the bore in the shaft incident to rotation of said externally threaded means relative to the shaft;

third means, comprising a housing structure having a cylindrical opening providing an encircling wall, in which opening a portion of said shaft comprising said transverse opening is rotatably disposed closely adjacent to said encircling wall;

and fourth means, comprising a friction element disposed in said transverse opening in contact with said tapered wedge portion and arranged to be forced outwardly thereby into frictional contact with the encircling wall of the bore of said third means incident to translation of said tapered wedge portion in one direction, whereby the resistance to rotation of said shaft in the opening of said third means may be adjusted by rotation of said externally threaded means relative to said shaft.

9. An adjustable instrument comprising:

first means, including a housing having means at one wall thereof providing a cylindrical opening extending into the housing and providing a cylindrical wall, and adjustable instrumentalities in said housing;

second means, including a rotary adjusting shaft, said shaft being connected to said adjustable instrumentalities for effecting adjustment thereof and said shaft extending through said cylindrical opening to the exterior of said housing and being rotatable in said cylindrical opening, said shaft further having an interior longitudinally-extending bore at at least one end of the shaft and said shaft having an internal screw thread along at least a part of said bore and said shaft further having a set of transverse openings extending from said bore outwardly to the exterior of the shaft;

third means, comprising a set of members each disposed at least in part in a respective one of said transverse openings and each having an outer friction surface disposed in frictional engagement with said cylindrical wall and each having an inner portion adapted and arranged to be operated by actuating means; and fourth means, including means disposed at least in part in said bore of said shaft and having actuating means engaging said members for operating said members and having rotatable means with a screw thread complementary to and engaging the said internal screw thread and connected to said actuating means to operate the latter incident to rotation of said rotatable means relative to said shaft, whereby incident to rotation of said rotatable means relative to said shaft said actuating means operates said members to vary the frictional engagement thereof with said cylindrical wall to vary the resistance to rotation of said shaft relative to said housing.

10. A variable resistor comprising:

first means, including a housing, providing an enclosed space and means forming an opening in said housing to said space;

second means, including a set of resistor devices comprising a resistance element having terminal connections to respective electrical ends of the element and including wiper contact means, said second means being disposed in said housing and one of said resistor devices being rotatable relative to the other thereof and the other thereof being supported by and stationary relative to said first means;

third means, including rotary means comprising a shaft, connected to and arranged to rotate the rotatable one of said resistor devices, said shaft extending from within said enclosed space through said opening to the exterior of said housing for application thereto of torque for rotating the shaft, and said shaft having a longitudinally extending bore therein open at an end of said shaft, and said shaft having portions defining a transverse passage extending from said bore to the exterior of the shaft; and fourth means, including movable means disposed at least in part in said transverse passage and having a surface arranged to frictionally engage said first means in said opening, said fourth means including actuating means adjustably disposed in said bore for actuating said movable means to vary the magnitude of the frictional engagement of said movable means with said first means, whereby by adjustment of said actuating means the intensity of the frictional engagement of said movable means with said first means is varied to adjust the resistance to rotation of said shaft to a desired value.

References Cited by the Examiner

UNITED STATES PATENTS

| | | | |
|---|---|---|---|
| 2,047,219 | 7/1936 | Meyer. | |
| 2,293,085 | 8/1942 | Stieber. | |
| 2,651,531 | 9/1953 | Smith | 287—53 |
| 2,850,287 | 9/1958 | Jackson | 279—2 |
| 3,198,293 | 8/1965 | Mathews | 188—70 X |

RICHARD M. WOOD, *Primary Examiner.*

ANTHONY BARTIS, *Examiner.*

J. G. SMITH, *Assistant Examiner.*